May 9, 1939. E. C. WEISKOPF 2,157,875
AUTOMATIC IMMERSION APPARATUS
Filed Nov. 26, 1937 7 Sheets-Sheet 1

Inventor
EDWIN C. WEISKOPF.
Harry Cohen
Attorney

May 9, 1939.  E. C. WEISKOPF  2,157,875

AUTOMATIC IMMERSION APPARATUS

Filed Nov. 26, 1937   7 Sheets-Sheet 2

Inventor
EDWIN C. WEISKOPF
By Harry Cole
Attorney

May 9, 1939.  E. C. WEISKOPF  2,157,875
AUTOMATIC IMMERSION APPARATUS
Filed Nov. 26, 1937    7 Sheets-Sheet 4

Inventor
EDWIN C. WEISKOPF.
By
Harry Cohn
Attorney

May 9, 1939. E. C. WEISKOPF 2,157,875
AUTOMATIC IMMERSION APPARATUS
Filed Nov. 26, 1937 7 Sheets-Sheet 5

Inventor
EDWIN C. WEISKOPF.
By Harry Cohn
Attorney

May 9, 1939.  E. C. WEISKOPF  2,157,875
AUTOMATIC IMMERSION APPARATUS
Filed Nov. 26, 1937  7 Sheets-Sheet 6

Inventor
EDWIN C. WEISKOPF.
By
Harry Cohn
Attorney

May 9, 1939. E. C. WEISKOPF 2,157,875
AUTOMATIC IMMERSION APPARATUS
Filed Nov. 26, 1937 7 Sheets-Sheet 7

Inventor
EDWIN C. WEISKOPF.
By Harry Cohn
Attorney

Patented May 9, 1939

2,157,875

UNITED STATES PATENT OFFICE 2,157,875

AUTOMATIC IMMERSION APPARATUS

Edwin C. Weiskopf, New York, N. Y., assignor to Harry Cohen, New York, N. Y.

Application November 26, 1937, Serial No. 176,768

9 Claims. (Cl. 214—17)

The present invention relates to automatic immersion apparatus.

While useful for other purposes, the apparatus embodying the present invention is intended primarily for use in laboratories and more particularly in connection with the treatment of tissue specimens in the preparation thereof for diagnosis. In the use of this apparatus the tissue is immersed in various liquids or other media for predetermined lengths of time and is automatically trnsferred from one liquid to another at the proper times. In other words after the tissue is placed in the holder therefor and the apparatus is set into operation, the steps in the process of treating the tissue for preparing the same for diagnosis or for other purposes are performed automatically by the apparatus without attention and without intermediate handling of the tissue during its preparation.

One of the objects of the present invention is to provide an automatic immersion apparatus of the character described which is reliable and accurate in operation.

Another object of the invention is to provide an automatic immersion apparatus with means for facilitating and improving the accuracy of the time controlled operations of the apparatus or parts thereof in the course of the process of preparing the tissue.

A further object of the invention is to provide the apparatus with a simple device for automatically covering and uncovering the fluid receptacles during the transfer of the tissues from one receptacle to another in the course of the preparation of the tissue in the operation of the apparatus.

A further object of the invention is the provision in the apparatus of means for substantially eliminating the dripping of the liquid which might otherwise occur in transferring the tissues from one receptacle to another during the operation of the apparatus.

It is also an object of the invention to provide an apparatus having timing control means which can be readily regulated and adjusted by the user of the apparatus.

A yet further object of the invention is generally to provide an improved automatic immersion apparatus, one which is mechanically well constructed, and which is also well adapted, and designed for convenience in use and reliability and accuracy in operation.

For a complete understanding of the invention, reference is to be had to the following description considered with reference to the accompanying drawings:

In the drawings:

Fig. 12 is a sectional view on the line 12—12 of Fig. 12;

Fig. 13 is a front view of a switch mechanism and of the timing device associated therewith;

Figure 2:
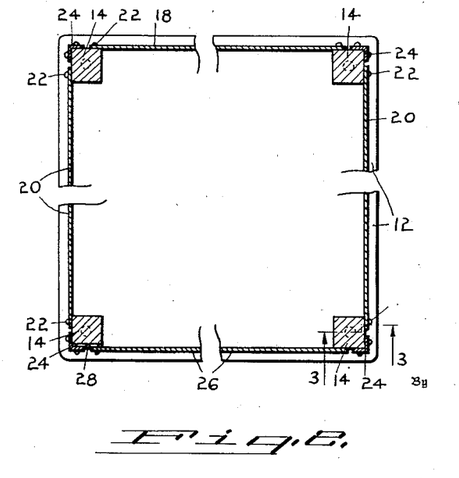
Fig. 2 is a transverse sectional view of the cabinet.
Figure 3:
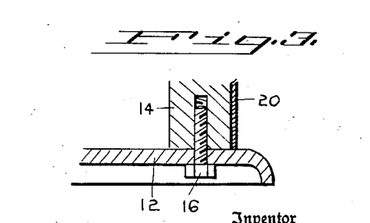
Fig. 3 is a detail sectional view on the line 3—3 of Fig. 2.
Figure 4:
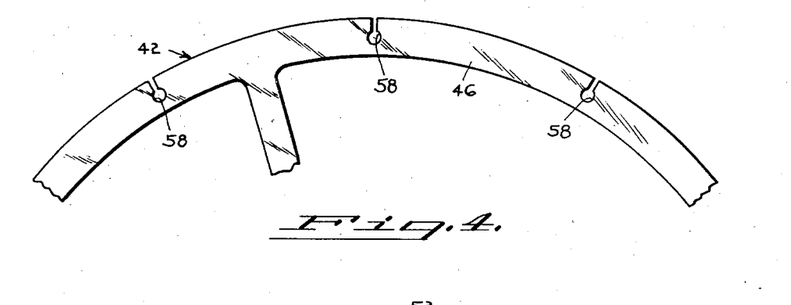
Fig. 4 is a fragmentary plan view of the rotary carrier forming part of the apparatus.

Referring now to the drawings in detail, the apparatus embodying the present invention comprises a cabinet 10 in which the major portion of the moving parts are housed. Said cabinet, which may be made of any suitable material, preferably metal, comprises a base 12 to which four corner posts 14 constituted preferably by metal rods are secured in upstanding relation by screws 16. A rear wall 18 and side walls 20, preferably composed of sheet metal are secured to posts 14 in any suitable way as by screws 22. Angle irons 24, also secured to said posts as shown more clearly in Fig. 2, serve together with the adjacent portions of the cabinet walls to completely cover the outer surfaces of posts 14. A door 26 is provided at the front of the cabinet and is mounted by means of hinges 28 for swinging movement for opening and closing the door. Said door is provided with a central glass cover opening 20 through which the timing device may be viewed, and is also provided with a latch 31 of any suitable construction for releasably holding the door in closed position.

A receptacle-table or support 32 is mounted on the top of the cabinet and is preferably secured in position, resting on the top surfaces of posts 14 by screws 34 which engage said table and are threaded into said posts. A plurality of shallow pans 36 of sheet metal are fixed to the table 32 and are disposed thereon in equi-spaced circumferential relation for removably receiving and positioning fluid receptacles 38 in similar equi-spaced circumferential relation. As here shown, one of the pans 36 has removably mounted therein a receptacle device 40 known in the art as a paraffin bath which, however, requires no specific description as it is not per se part of the present invention.

A rotary and vertically movable conveyor or carrier 42 of metal fixed to a rotary and vertically movable shaft 44 and movable with the latter is disposed above the receptacles 38 and has a rim 46 disposed over said receptacles. A cover 48 for each receptacle is carried by rim 46. Said cover includes a rod 50 having a headed portion 52 and a stem comprising stem portions 54 and 56 of different diameters whereby each rod 50 may be removably assembled with rim 46. For this purpose said rim is provided with key-hole slots 58, it being understood that rod 50 may be assembled with and removed from rim 46 by inserting the smaller rod portion 56 through the narrower portion of slot 58, which, when the head 52 of the rod rests upon rim 46, prevents lateral displacement of rod 50 with respect to said rim. Rods 50 are slidable in the larger parts of said slots 58 so that carrier 42 may have some vertical movement in relation to receptacles 38 and 40.

Figure 1:
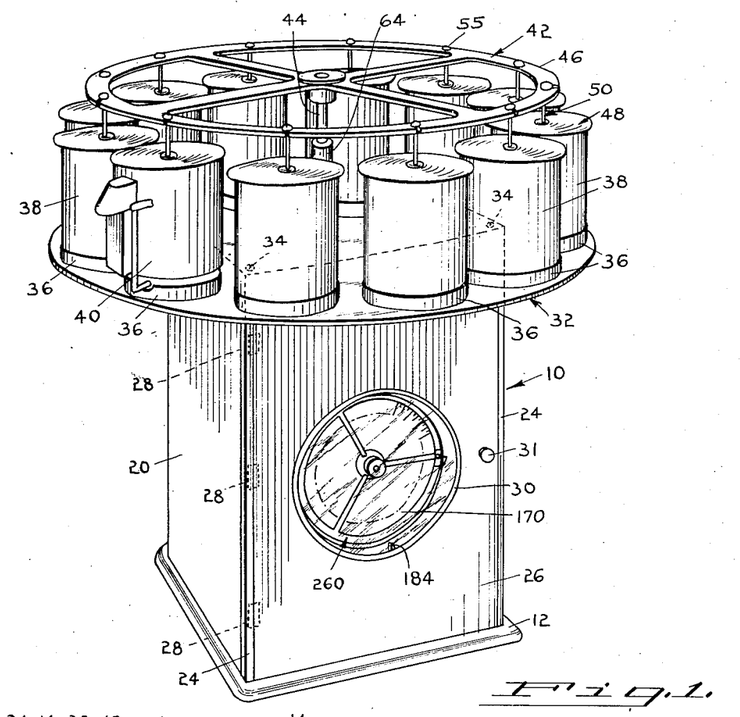
Fig. 1 is a perspective view of an automatic immersion apparatus embodying the present invention.
Figures 5, 5A:
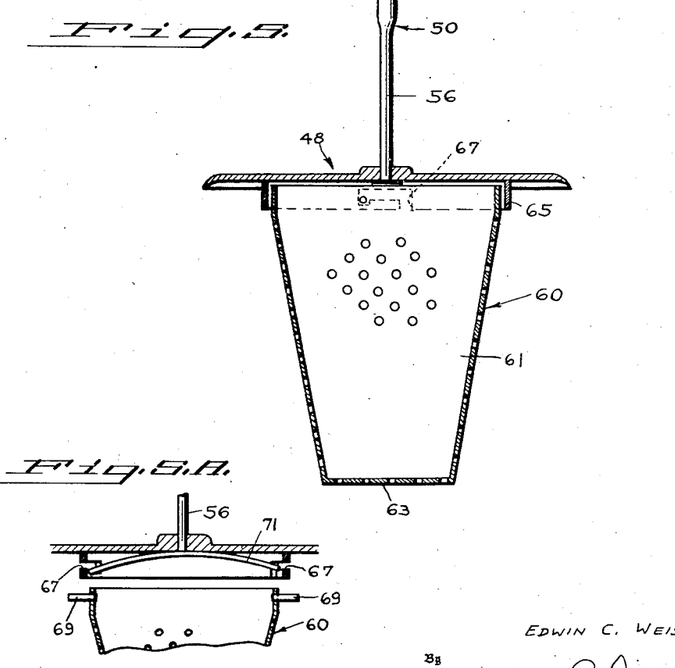
Fig. 5 is a side view, partly in elevation and partly in section of one of the receptacle covers and of the holder for the specimen.
Fig. 5a is a fragmentary sectional view taken at right angles to Fig. 5, showing the holder detached.

As shown in Figs. 1 and 5, a perforated metal container or holder 60 is removably secured to and carried by one of the covers 48 for movement with said cover into and out of said receptacles. When the apparatus is used for preparing tissue for diagnosis, the specimen of tissue is placed within said holder and is therein contained throughout the operation of the apparatus. More specifically, holder 60 containing the tissue is successively immersed in the fluids or other media in the various receptacles. Any suitable means may be provided for removably securing holder 60 to one of the covers 48. As here shown, said holder is secured to cover 48. It will be understood that in the operation of the apparatus, which as will be described in greater detail hereinafter, the holder 60 containing the specimen tissue or other specimen is transferred successively from one receptacle to the other at predetermined times in the operation of the apparatus under the control of timing devices and mechanisms which will be subsequently described. For accomplishing this transfer and successive immersion of the tissue from the fluid of one receptacle to the fluids of the other receptacles, said holder is raised above the top of the particular receptacles from which it is to be transferred and is then moved laterally over the next receptacles into which it is lowered for immersion in the fluid in the latter receptacle, and this operation is repeated until the specimen has been immersed in all such fluids as may be desired. In thus transferring the holder from one receptacle to another, it is desirable to prevent dripping of the liquid from the holder onto the table or into the next receptacle. I have discovered that dripping can be substantially prevented by utilizing a holder having tapered side walls 61 and a relatively narrow bottom 63, as illustrated in Fig. 5, and this constitutes one of the features of the present invention. As shown in Figs. 5 and 5a, the cover to which holder 60 is connected is provided with an internal flange 65 having opposed bayonet slots 67 in which pins 69 fixed at the upper edge of holder 60 are received. A spring 71 fixed to cover 48 engages the upper edge of the holder for releasably holding the pins in slots 67.

Figure 6:
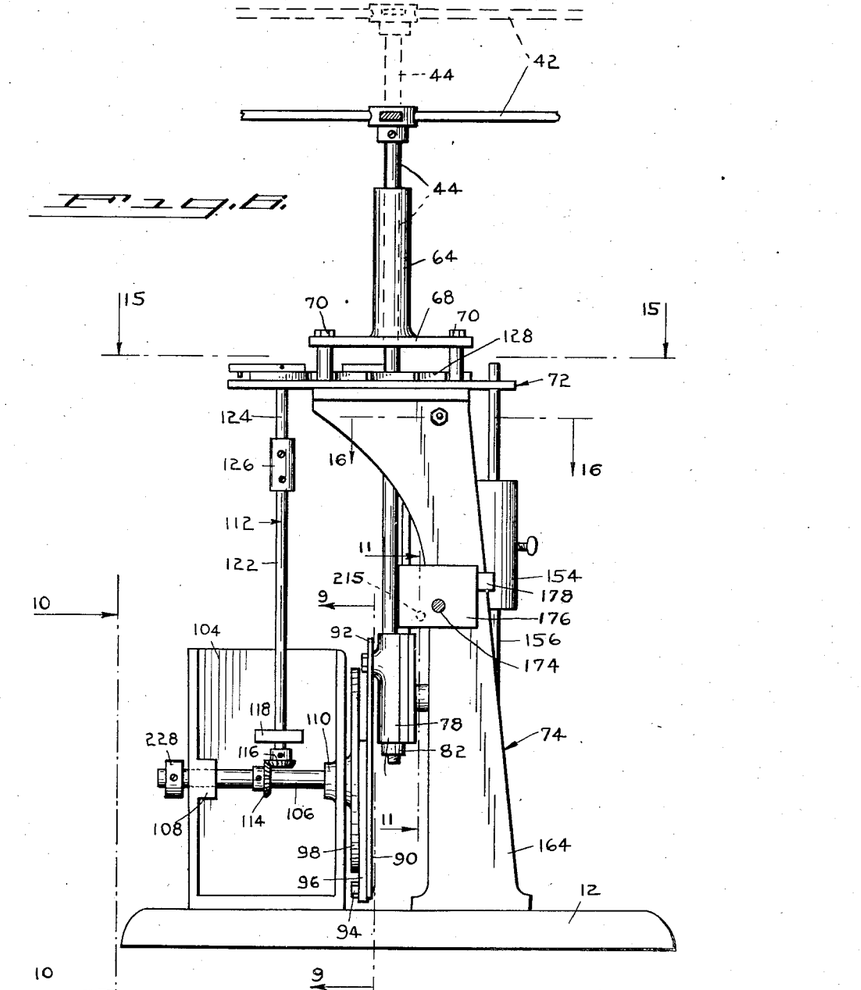
Fig. 6 is a front view of the apparatus with the cabinet and certain mechanisms omitted for the sake of clearness and illustration.
Figures 7, 8:
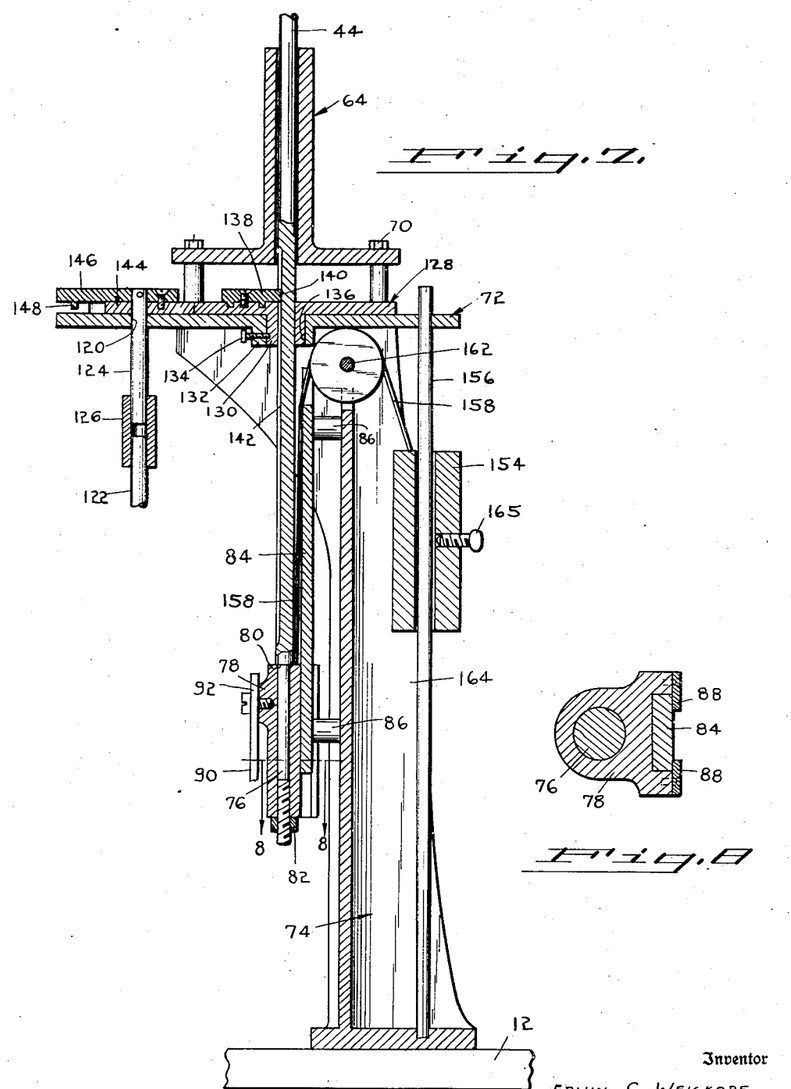
Fig. 7 is a vertical sectional view of part of the mechanism.
Fig. 8 is a detail sectional view on the line 8—8 of Fig. 7.

The means for actuating shaft 44 to move carrier 42 vertically and rotatably will now be described. As illustrated in Figs. 6 and 7, said shaft is mounted for longitudinal and rotary movement in a guide bearing 64 having a lower circular flange 66 secured by means of bolts 70 in spaced relation above the plate or top surface 72 of a standard 74 secured to and upstanding from the cabinet base 12. Said shaft has a reduced lower end portion 76 secured to and rotatably mounted in a cross head 78. The reduced shaft portion 76 provides a shoulder 80 which engages one end of said cross head, and the free end of said reduced shaft portion is threaded for engagement by a nut 82 which engages the other end of said cross head to fix the shaft longitudinally in relation to said cross head while permitting rotation of the shaft therein. Cross head 78 is guided for longitudinal movement on a guide bar 84 fixed to standard 74 by bolts and spacing members 86, said cross head being removably secured in relation to said guide bar by side straps 88 fixed thereto and overlapping guide bar 84 as illustrated in Fig. 8.

Figures 9, 10:
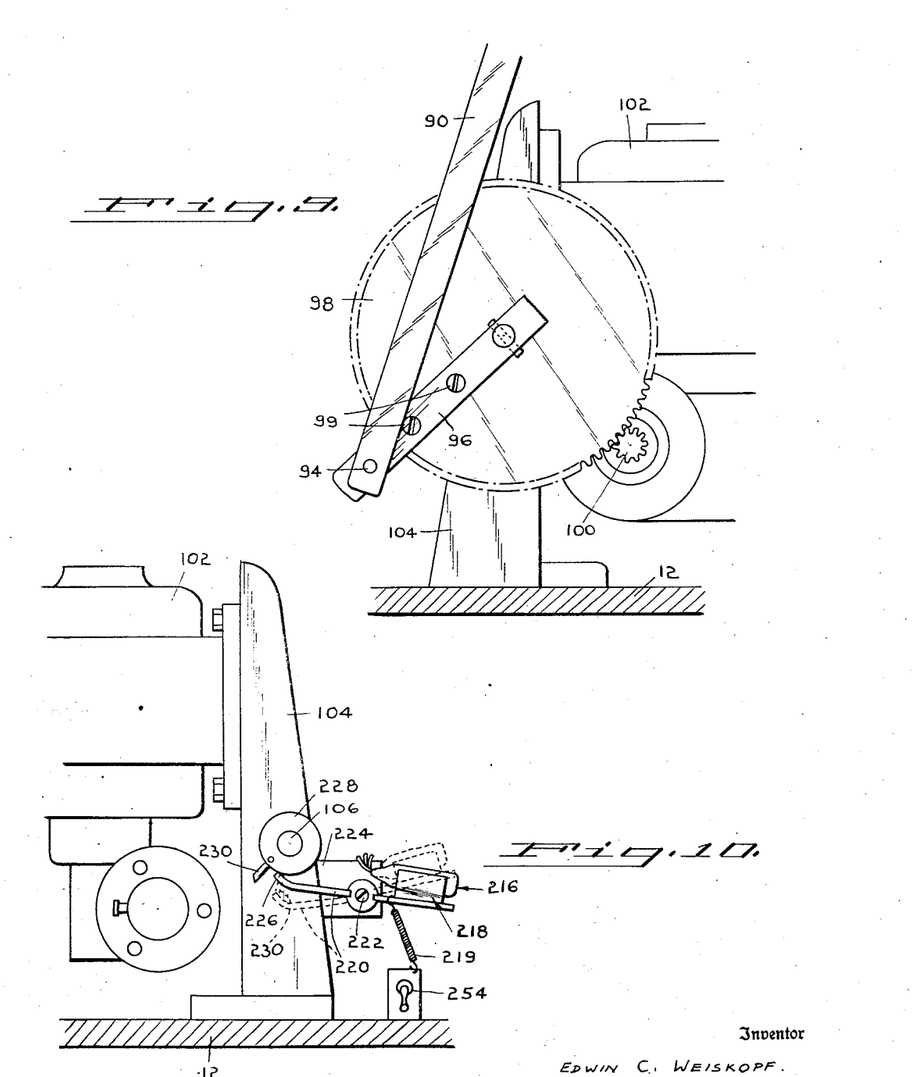
Fig. 9 is a view on the line 9—9 of Fig. 6.
Fig. 10 is a side view in elevation on the line 10—10 of Fig. 6.

Cross head 78 and shaft 44 fixed thereto are reciprocated by a link or connecting rod 90 pivotally secured at one end 92 thereof to said cross head and pivotally secured at its other end 94 to a crank rod 96 fixed to a rotary gear 98 in any suitable way, as by screws 99. Gear 98 meshes with and is rotated by a gear 100 (Fig. 9) operated by a motor 102. Said motor is carried by a standard 104 fixed to and upstanding from cabinet base 12. Gear 98 is fixed to and rotates a shaft 106 (Fig. 6) which is journalled in bearings 108 and 110 on standard 104. A rotary shaft 112 is operated during the rotation of shaft 106 by gear 98 through bevelled gears 114 and 116 fixed to shafts 106 and 112, respectively. Shaft 112 is journalled for rotation adjacent its ends in a bearing 118 carried by standard 104 and in a bearing opening 120 formed in plate 72. As here shown, shaft 112 comprises sections 122 and 124 adjustably coupled together by a coupling sleeve 126.

It will be understood that the rotation of gear 98 is effective to move shaft 44 longitudinally and also, as will now be described, rotation of shaft 112 is effective to cause the intermittent rotation of shaft 44. The mechanism provided for this purpose comprises a Geneva gear 128 (Figs. 7 and 15) which surrounds shaft 44 and through which said shaft is longitudinally movable. Said Geneva gear rests on the surface of standard plate 72 and has a bearing on said surface. Said gear is provided with a hub 130 which has a bearing in a depending flange 132 of plate 72 for rotation therein and is held against longitudinal movement by a pin 136 which is threaded in flange 132 and engages hub 130 in a peripheral groove 136. Gear 128 is provided with a plate 138 fixed thereto. Said plate has a projection 140 which engages shaft 44 in a longitudinal groove 142 provided in said shaft whereby rotation of gear 128 is effective to rotate shaft 44. Gear 128 is rotated by shaft 112 through a cooperating gear 144 of the Geneva gear movement. Said cooperating gear 144 is provided with a plate 146 fixed thereto and carrying a pin 148 arranged to enter the radial slots 150 of gear 128, whereby upon continuous rotation of cooperating gear 144 Geneva gear 128 is caused to rotate intermittently for a part of a revolution thereby to similarly cause shaft 44 to rotate intermittently or to move for a corresponding part of a revolution. As here shown, gear 128 is provided with twelve radial slots 150 to accomplish twelve partial rotations of said shaft for moving carrier 42 to position the holder 60 in relation to twelve receptacles provided in the apparatus here shown, but it will be understood that the number of slots in said gear may be varied depending upon the number of different immersions or treatments to which the specimen is subjected or depending upon the intended use of the apparatus. It will be observed that cooperating gear 144 is rotatably mounted on plate 72 and is secured to the upper end of shaft 112, more specifically to the upper shaft section 120, by a pin 152.

From the above description it will be understood that when gear 98 is rotated for a complete revolution upon actuation of motor 102 and motor gear 100, shaft 44 is moved longitudinally upwardly for the full longitudinal travel thereof and longitudinally downwardly for the full distance of its travel, and that during the rotation of gear 98 for effecting the reciprocation of shaft 44 upwardly and downwardly, shaft 112 makes one complete revolution. It will also be understood that the Geneva gear movement is such that during the initial upward movement of shaft 44 pin 148 does not engage any of the slots 150, and cooperating gear 144 is therefore ineffective to rotate Geneva gear and shaft 44. However, when shaft 44 has been moved upwardly a sufficient distance to move holder 60 completely out of the receptacle to clear the top of the latter, pin 148 engages Geneva gear 128 in a slot 150 causing said gear and shaft 44 to rotate whereby to move holder 60 over the next receptacle. During the rotation of shaft 44 as just described the upward movement of said shaft is continued to the end of its travel and at about the time the rotary movement of said shaft is completed to center the holder 60 over the next receptacle, the shaft is moved downwardly to position the holder within said next receptacle. Thus it will be seen that the gearing arrangement is such that shaft 44 is actuated to raise holder 60 out of its receptacle, then to move said holder to position and center the same over the next receptacle by a partial rotation of said shaft and then to move said holder downwardly into the next receptacle whereupon the movement of the shaft is interrupted for the time being until the next operation thereof for moving the holder out of the last mentioned receptacle and into the next receptacle.

In accordance with the present invention, provision is made for balancing the upward and downward movement of the shaft 44 whereby to obtain a more uniform longitudinal movement of said shaft in said up and down directions. For this purpose, there is provided a counter-weight 154 (Figs. 7 and 16) guided for up and down movement on a rod 156 fixed in standard 74. Said counter-weight 154 is connected to one end of a chain or belt 158 which passes over a rotary pulley 160 and is connected at its other end to cross head 78. Pulley 160 is mounted for rotation on a shaft or rod 162 secured at its ends in the sides 164 of standard 74. The arrangement of the parts is such that said counter-weight is raised to the limit of its upward movement when shaft 44 is at the limit of its downward movement. A set screw 165 is provided for securing weight 154 against movement during shipment of the apparatus.

Figures 11, 15, 16:
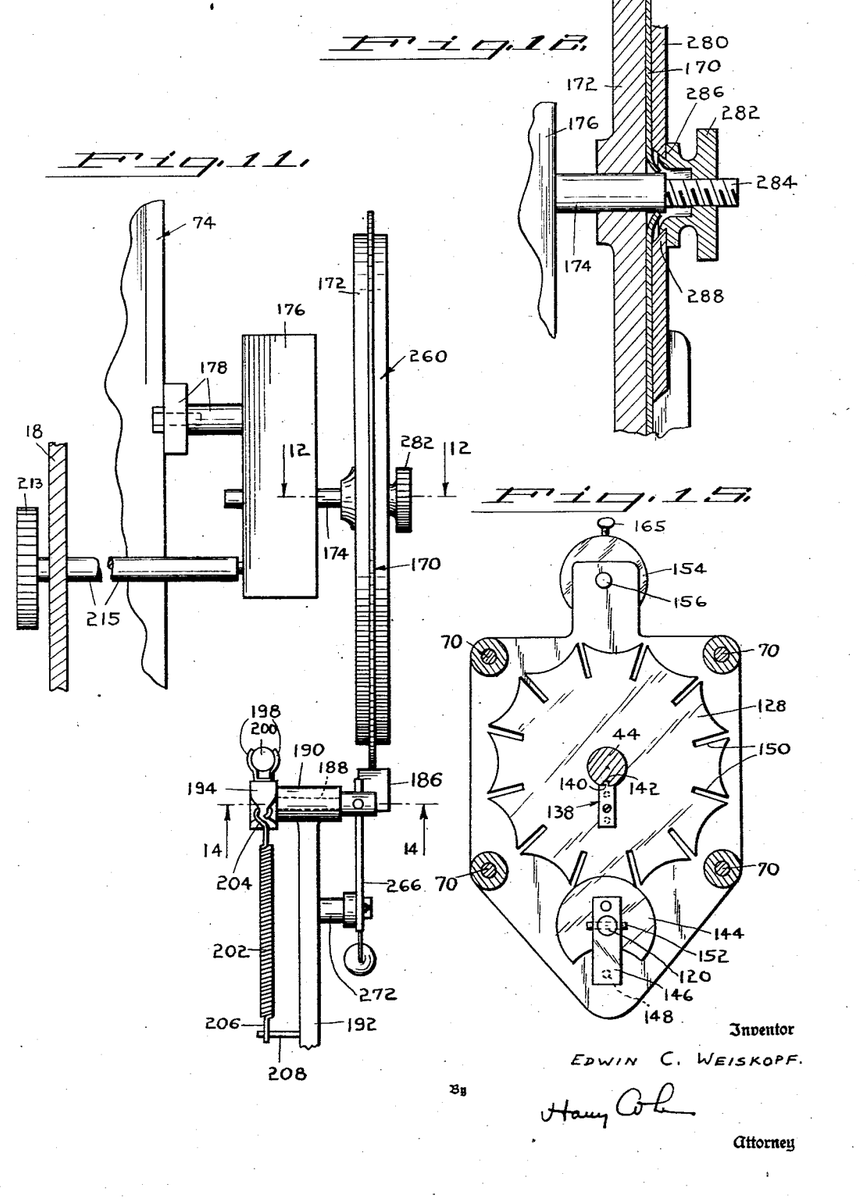
Fig. 11 is a view on the line 11—11 of Fig. 6.
Fig. 15 is a sectional view on the line 15—15 of Fig. 6.
Fig. 16 is a sectional view on the line 16—16 of Fig. 6.

The above described successive movements of the shaft occurs under the control of timing devices and mechanisms which will now be described. Referring more particularly to Figs. 1, 11 and 13, there is provided a rotary selector disk 170 removably mounted on a rotary metal plate 172 fixed to and rotatable with a spindle or shaft 174 actuated by a clock work 176 secured to the front of standard 74 by a bracket 178. The gear arrangement of clock 176 is such that shaft 174 makes one revolution in twenty-four hours although for some purposes there may be substituted a clock having a gear arrangement such that the shaft 174 makes one revolution in forty-eight hours or longer. Selector disk 170 may be made of any suitable material, such as compressed fibre, wood, or sheet metal and has the outer face thereof graduated in intervals of time as indicated generally by the lines 180 in Fig. 13. Radial grooves 182 are provided in circumferential spaced relation in the marginal edge portions of the disk for receiving the free upwardly directed end portion 184 of a pivoted arm 186 secured at its opposite end to a pin 188 journalled in a bearing 190 at the upper end of a standard 192. Pin 188 projects rearwardly through bearing 190 and has fixed thereto a bracket 194 provided with a spring clip holder 196 having spaced sides 198 in which a mercury switch 200 is removably secured. A tension spring 202 is connected at one end 204 thereof to bracket 194 and at its other end 206 to an eye-bolt 208 fixed to standard 192. The arrangement is such that spring 202 tends to move arm 186 in a counter clockwise direction, viewing Fig. 13, whereby the free edge 185 of arm portion 184 is held in resilient engagement with the outer peripheral edge 210 of disk 170 and to cause said end portion 184 to enter the groove 182 when the latter registers with said arm portion at predetermined times during the rotation of said disk which as indicated by the arrow 212 in Fig. 13 takes place in a clockwise direction. It will be understood that as disk 170 continues to rotate, it being rotated continuously by clock 176, arm portion 184 eventually is forced out of groove 182 into which it has been projected by spring 202, and it will be observed that this movement is facilitated by the curved edge 214 of groove 182. As illustrated in Fig. 11, the actuating spring of clock 176 may be wound by rotating knob 213 at the back of cabinet wall 18, said knob being fixed to a rod 215 which extends to and is connected to the winding stem of the clock.

Figures 14, 15, 16, 17:
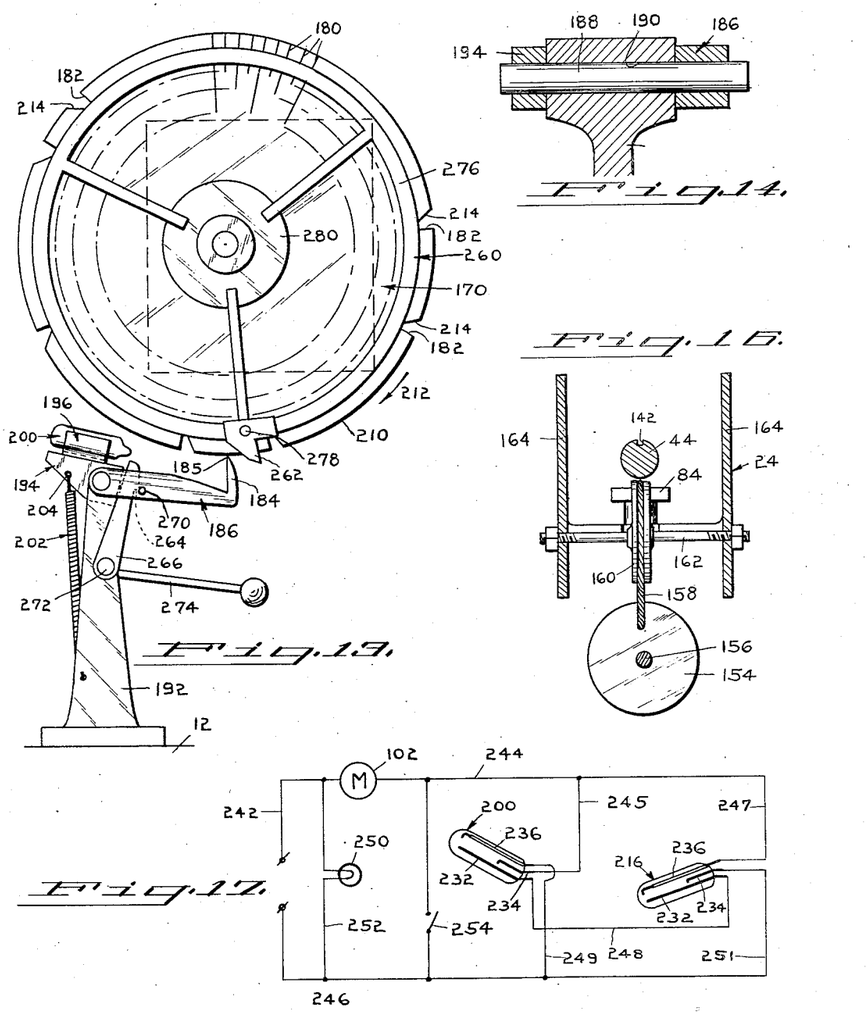
Fig. 14 is a sectional view on the line 14—14 of Fig. 11.
Fig. 17 is a wiring diagram.
Figure 18:
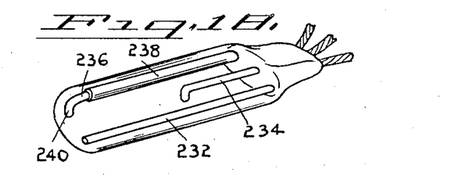
Fig. 18 is a side view of a switch.

As is apparent from the wiring diagram illustrated in Fig. 17, mercury switch 200 is operatively associated in an electric circuit with another mercury switch 216 for controlling together with the latter the energization of motor 102. Switch 216 is removably secured in a spring clip 218 (Fig. 10) carried by a lever 220 mounted between its ends on a pivot pin 222 fastened to a bracket 224 projecting from and fixed to standard 104. The end portion 226 of lever 220 is arcuately curved and is disposed below a collar 228 fixed to the outer end of shaft 106 and rotatable therewith. Collar 228 is provided with a pin projection 230 arranged to releasably engage end 226 of lever 222 for tilting mercury switch 216. Each mercury switch comprises, as illustrated in Fig. 18, three electrodes 232, 234 and 236. Electrode 236 is housed within an insulation tube 238 whereby said electrode is insulated from central electrode 234, but is provided with a bare reflexed end portion 240 adapted to be contacted by the mercury or other conducting fluid when the switch is tilted downwardly or in a counter clockwise direction, viewing Figs. 17 and 18 for electrical connection with electrode 232. On the other hand when the switch is moved upwardly, or in a clockwise direction, the mercury moves away from the adjacent ends of electrodes 236 and 232, thereby to break the electrical connection therebetween, and makes an electrical connection between electrodes 232 and 234, electrode 234 being relatively short so that when the switch is tilted downwardly the circuit is broken between said electrodes. A spring 219 biases switch 216 to the position shown in full lines in Fig. 10.

Referring to Fig. 17, in the circuit for controlling the operating motor 102, one wire 242 from the power source is connected to one side of the motor, and the other side of the motor is connected by a wire 244 and by branch wires 245 and 247 to the electrode 234 of switch 200 and to the electrode 236 of switch 216 respectively. The other side of the power source is connected by a wire 246 and branch wires 249 and 251 to electrode 236 of switch 200 and to electrode 234 of switch 216. A wire 248 connects the electrodes 232 of switches 200 and 216 to each other. The circuit also includes a signal lamp 250 connected across the power source in advance of the motor 102 by a wire 252 and a manually operable switch 254 is connected in the circuit for controlling the motor circuit independently of switches 200 and 236.

From an examination of the wiring diagram shown in Fig. 17 it will be observed that when switch 200 is in its upwarly tilted positions shown in full lines with the electrical conection between electrodes 232 and 236 interrupted and with an electrical connection made between electrodes 232 and 234, and with switch 216 in the downwardly inclined position shown in full lines in Fig. 17, the circuit between electrodes 232 and 234 is interrupted and the circuit through motor 102 is interrupted, switch 254 being normally open. By reference to Fig. 13, it will be observed that switch 200 is in the circuit interrupting position just described when arm portion 184 is held out of a groove 182 by engagement of said arm portion with the peripheral edge of timing disk 170. When, however, upon a predetermined rotation of said disk to bring one of said grooves into alignment with said arm portion 184 to permit arm 186 to move counter clockwise whereby to allow spring 202 to downwardly tilt switch 200, an electrical connection is made between electrodes 232 and 236 of switch 200. When this occurs, current flows from one side of the power source through wire 246 and wire 249 to electrode 236 and through the mercury to electrode 232 of switch 200 and from the latter by wire 248 to electrode 232 of switch 216, the latter being still downwardly inclined, from electrode 232 through the mercury to electrode 236 and from the latter by means of wires 247 and 244 to the motor and thence by wire 242 to the other side of the power source.

The motor is thus energized and actuates shaft 44 as described above for raising and lowering said shaft and also for rotating said shaft through the operation of shafts 106 and 122 and the Geneva gear movement previously described. Shaft 106 makes one complete revolution with the result that pin 230 carried by collar 228 moves from the full line position shown in Fig. 10 to the dotted line position there shown. Lever 220 is moved in a counter clockwise direction, viewing Fig. 10, causing switch 216 to tilt to interrupt the circuit between electrodes 232 and 236 thereof with the result that the circuit through the motor is interrupted and the operation of the apparatus is interrupted and the parts come to rest. In the meantime timing disk 170 continues to rotate by the actuation of clock 176 and arm portion 184 is forced out of groove 182 into engagement with the peripheral edge of said disk. This causes switch 200 to tilt so that the electrical connection between electrodes 232 and 236 of said switch is broken and the electrical connection between electrodes 232 and 234 is made. At this time the electric circuit, through motor 102, is completed momentarily and switch 216 is in position so that current may flow from wire 242 to the motor and thence by way of wires 244 and 245 to switch 200, at electrode 234, and from said switch by way of electrodes 232 and 234 thereof to switch 216 by way of electrodes 232 and 234 thereof and from the last mentioned switch by way of wires 251 and 246 to the other side of the power source. This electrical connection exists only until shaft 106 is rotated sufficiently to disengage pin 230 from the adjacent end of switch lever 220 and when that occurs, said lever pivots in a counter clockwise direction causing switch 216 to tilt so as to interrupt the circuit between electrodes 232 and 234 of said switch. However, as switch 200 remains in its position illustrated in full lines in Fig. 17, the circuit remains interrupted until the rotation of disk 170 brings a groove 182 into alignment with switch arm portion 184 to permit the cycle of operations described above to be repeated for again energizing motor 102 whereby to operate shaft 44 for transferring the tissue specimen from one receptacle to the next receptacle.

Provision is made for interrupting the circuit at the end of the process of treating the tissue or other specimen by the present apparatus and for releasably preventing automatic reestablishment of the circuit, notwithstanding the continued rotation of timing disk 170 and the alignment of any of the grooves with arm portion 184. For this purpose, annular member 260 provided with a radially projecting cam portion 262 is secured to disk 172 over timing disk 170 in fixed relation to the latter, and rotates therewith. Thus, at a predetermined time, as for example at the end of twenty-four hours or sooner, depending upon the time necessary for completing the process of treating the tissue or other specimen, cam 262 engages arm portion 184 causing the latter to move in a clockwise direction, viewing Fig. 13. When this occurs, a latch 264 provided on a pivoted arm 266 engages a pin 270 on arm 186 to releasably retain said arm against movement in a counter clockwise direction, with the result that the alignment of any of the grooves 182 with arm portion 184 has no effect, for the time being, upon said arm and is therefore ineffective to initiate the movement of switch 200 for establishing a circuit through the operating motor. Latch arm 266 is pivotally mounted on a pivot pin 272 carried by standard 192 and is releasably held in engagement with pin 270 by a weighted arm 274. It will be understood that upon subsequently setting the apparatus into operation, latch 264 is released from pin 270 so that arm 186 is free to follow the contour of timing disk 170 for the control of switch 200. For setting cam 262 for controlling the time of final interruption of the circuit, said cam is adjustable circumferentially of the peripheral portion 276 of member 260. For this purpose cam 262 engages peripheral portion 276 and is adjustably secured in position by a set screw 278.

It will be observed from an inspection of Figs. 11 and 12 that member 260 serves to fasten or clamp the cam disk 170 in position on carrier disk 172. For this purpose the hub portion 280 of member 260 is arranged to be clamped against the inner central portion of cam disk 170 by means of a nut 282. As clearly shown in Fig. 12, said nut has a screw threaded engagement with a screw threaded portion 284 of clock spindle 174 and has a peripheral groove 286 in which an inner peripheral portion 288 of hub 280 is relatively rotatable so that while nut 282 is permanently connected to hub 280 of mebber 260 relative rotation can occur between said hub and nut 282 for the purpose just described. Upon removal of nut 282 from spindle 174 by unscrewing the nut, member 260 is also removed to permit removal and replacement of selector disk 170 by another such disk having appropriately spaced grooves, such as the grooves 182, for obtaining the desired operation of the apparatus. In practice, a number of non-grooved disks are supplied to the users of the apparatus and the latter cut grooves 182 in the disks to suit their requirements.

While I have shown and described the preferred embodiment of my invention, it will be understood that the latter may be embodied otherwise than as here shown and it will be further understood that in the apparatus herein shown and described certain changes in the construction and arrangement of parts may be made and will occur to those skilled in the art. Therefore, I do not wish to be limited precisely to the construction herein shown or described, except within the scope of the appended claims.

Having thus described my invention, what I claim and desire to secure by Letters Patent is:

1. In apparatus of the class described comprising a plurality of receptacles, a rotatable and longitudinally movable shaft, a holder mounted for movement by said shaft into and out of said receptacles in succession, means for intermittently moving said shaft longitudinally and rotatably in timed relation, and an electric motor for actuating said means, means including a rotary timing disk and switch mechanisms operable under the control of said disk for controlling the energization of said motor whereby to actuate said means at predetermined time intervals, said timing disk having circumferentially spaced notches in its peripheral edge portion, one of said switch mechanisms including a movable arm having a part engageable with said disk at its peripheral edge and in said notches, said arm being biased for movement to engage said part thereof with said disk, and means rotatable with said disk for moving said part of the arm to retracted position out of engagement with said disk.

2. In apparatus of the class described comprising a plurality of receptacles, a rotatable and longitudinally movable shaft, a holder mounted for movement by said shaft into and out of said receptacles in succession, means for intermittently moving said shaft longitudinally and rotatably in timed relation, and an electric motor for actuating said means, means including a rotary timing disk and switch mechanisms operable under the control of said disk for controlling the energization of said motor whereby to actuate said means at predetermined time intervals, said timing disk having circumferentially spaced notches in its peripheral edge portion, and one of said switch mechanisms including a movable arm having a part engageable with said disk at its peripheral edge and in said notches, said arm being biased for movement to engage said part thereof with said disk, means rotatable with said disk for moving said part of the arm to retracted position out of engagement with said disk, and latch means for releasably holding said arm in said retracted position.

3. In apparatus of the class described comprising a plurality of receptacles, a rotatable and longitudinally movable shaft, a holder mounted for movement by said shaft into and out of said receptacles in succession, means for intermittently moving said shaft longitudinally and rotatably in timed relation, and an electric motor for actuating said means, means including a rotary timing disk and switch mechanisms comprising a plurality of mercury switches mounted for tilting movement and movable under the control of said disk for controlling the energization of said motor whereby to actuate said means at predetermined time intervals, said timing disk having circumferentially spaced notches in its peripheral edge portion, and one of said switch mechanisms including a movable arm carrying one of said mercury switches for tilting the same and a part engageable with said disk at its periphery and in said notches, said arm being biased for movement to engage said part thereof with said disk, and means rotatable with said disk for moving said part of the arm to retracted position out of engagement with said disk.

4. In apparatus of the class described comprising a plurality of receptacles, a rotatable and longitudinally movable shaft, a holder mounted for movement by said shaft into and out of said receptacles in succession, means for intermittently moving said shaft longitudinally and rotatably in timed relation, and an electric motor for actuating said means, means including a rotary timing disk and switch mechanisms comprising a plurality of mercury switches mounted for tilting movement and movable under the control of said disk for controlling the energization of said motor whereby to actuate said means at predetermined time intervals, said timing disk having circumferentially spaced notches in its peripheral edge portion, and one of said switch mechanisms including a movable arm for tilting one of said switches and a part engageable with said disk at its periphery and in said notches, said arm being biased for movement to engage said part thereof with said disk, means rotatable with said disk for moving said part of the arm to retracted position out of engagement with said disk, and latch means for releasably holding said arm in said retracted position.

5. In apparatus of the class described comprising a plurality of receptacles, a rotatable and longitudinally movable shaft, a holder mounted for movement by said shaft into and out of said receptacles in succession, means for intermittently moving said shaft longitudinally and rotatably in timed relation, and an electric motor for actuating said means, means including a rotary timing disk and switch mechanisms comprising a plurality of mercury switches mounted for tilting movement and movable under the control of said disk for controlling the energization of said motor whereby to actuate said means at predetermined time intervals, said timing disk having circumferentially spaced notches in its peripheral edge portion, and one of said switch mechanisms including a movable arm carrying one of said switches for tilting the same, a part engageable with said disk at its periphery and in said notches, a member operable by a part of said shaft actuating means for tilting another of said switches, said arm being biased for movement to engage said part thereof with said disk, and means rotatable with said disk for moving said part of the arm to retracted position out of engagement with said disk.

6. In apparatus of the class described comprising a plurality of receptacles, a rotatable and longitudinally movable shaft, a holder mounted for movement by said shaft into and out of said receptacles in succession, means for intermittently moving said shaft longitudinally and rotatably in timed relation, and an electric motor for actuating said means, means including a rotary timing disk and switch mechanisms comprising a plurality of mercury switches mounted for tilting movement and movable under the control of said disk for controlling the energization of said motor whereby to actuate said means at predetermined time intervals, said timing disk having circumferentially spaced notches in its peripheral edge portion, and one of said switch mechanisms including a movable arm for tilting one of said switches, a part engageable with said disk at its periphery and in said notches, and a member operable by a part of said shaft actuating means for tilting another of said switches, said arm being biased for movement to engage said part thereof with said disk, means rotatable with said disk for moving said part of the arm to retracted position out of engagement with said disk, and latch means for releasably holding said arm in said retracted position.

7. In apparatus of the class described comprising a plurality of receptacles, a rotatable and longitudinally movable shaft, a holder mounted for movement by said shaft into and out of said receptacles in succession, means for intermittently moving said shaft longitudinally and rotatably in timed relation, and an electric motor for actuating said means, means including a rotary timing disk and switch mechanisms operable under the control of said disk for controlling the energization of said motor whereby to actuate said means at predetermined time intervals, said timing disk having circumferentially spaced notches in its peripheral edge portion, one of said switch mechanisms including a movable arm having a part engageable with said disk at its peripheral edge and in said notches, said arm being biased for movement to engage said part thereof with said disk, and means rotatable with said disk for moving said part of the arm to retracted position out of engagement with said disk, said arm-retracting means being adjustable circumferentially of said disk, and means for securing said arm-retracting means in adjusted position.

8. In apparatus of the class described comprising a plurality of receptacles, a rotatable and longitudinally movable shaft, a holder mounted for movement by said shaft into and out of said receptacles in succession, means for intermittently moving said shaft longitudinally and rotatably in timed relation, and an electric motor for actuating said means, means including a rotary timing disk for controlling the energization of said motor whereby to actuate said means at predetermined time intervals, said timing disk having circumferentially spaced notches in its peripheral edge portion, one of said switch mechanisms including a movable arm having a part engageable with said disk at its peripheral edge and in said notches, said arm being biased for movement to engage said part thereof with said disk, and means rotatable with said disk for moving said part of the arm to retracted position out of engagement with said disk, said arm-retracting means comprising a cam member secured to said disk and projecting outwardly beyond the periphery of the latter for engagement with said part of the arm.

9. In apparatus of the class described comprising a plurality of receptacles, a rotatable and longitudinally movable shaft, a holder mounted for movement by said shaft into and out of said receptacles in succession, means for intermittently moving said shaft longitudinally and rotatably in timed relation, and an electric motor for actuating said means, means including a rotary timing disk and switch mechanisms operable under the control of said disk for controlling the energization of said motor whereby to actuate said means at predetermined time intervals, said timing disk having circumferentially spaced radially extending notches in its peripheral edge portion, one of said switch mechanisms including a movable arm mounted for turning movement and having a part engageable with said disk at its peripheral edge and in said notches, a second arm mounted for turning movement and operated by said first mentioned arm, and a mercury switch carried by said second arm and tiltable thereby for controlling the energization of said motor and means carried by said disk and rotatable therewith for moving said first mentioned part of said arm to retracted position out of engagement with said disk.

EDWIN C. WEISKOPF.